(12) United States Patent
Yonemura et al.

(10) Patent No.: US 10,481,440 B2
(45) Date of Patent: Nov. 19, 2019

(54) LIQUID CRYSTAL DISPLAY DEVICE AND METHOD FOR MANUFACTURING THE SAME

(71) Applicant: Mitsubishi Electric Corporation, Tokyo (JP)

(72) Inventors: Koji Yonemura, Tokyo (JP); Yukihiro Kudou, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/835,101

(22) Filed: Dec. 7, 2017

(65) Prior Publication Data

US 2018/0173034 A1    Jun. 21, 2018

(30) Foreign Application Priority Data

Dec. 15, 2016  (JP) ................................ 2016-243153

(51) Int. Cl.
| | |
|---|---|
| *G02F 1/1339* | (2006.01) |
| *G02F 1/1333* | (2006.01) |
| *G02F 1/1335* | (2006.01) |
| *G02F 1/1343* | (2006.01) |

(52) U.S. Cl.
CPC .......... *G02F 1/1339* (2013.01); *G02F 1/1343* (2013.01); *G02F 1/13394* (2013.01); *G02F 1/133305* (2013.01); *G02F 1/133528* (2013.01); *G02F 1/133512* (2013.01); *G02F 1/133514* (2013.01); *G02F 2001/13396* (2013.01)

(58) Field of Classification Search
CPC ..................................................... G02F 1/1339
See application file for complete search history.

(56) References Cited

U.S. PATENT DOCUMENTS

| | | | |
|---|---|---|---|
| 2002/0027636 A1 | 3/2002 | Yamada | |
| 2010/0091234 A1* | 4/2010 | Nakahata | G02F 1/13394 349/155 |
| 2010/0110022 A1* | 5/2010 | Chen | G06F 3/0414 345/173 |
| 2014/0043549 A1* | 2/2014 | Taniguchi | G02F 1/13394 349/15 |
| 2014/0092350 A1* | 4/2014 | Byeon | G02F 1/1339 349/106 |

(Continued)

FOREIGN PATENT DOCUMENTS

| | | |
|---|---|---|
| JP | 2002-072179 A | 3/2002 |
| JP | 2004-126197 A | 4/2004 |

*Primary Examiner* — Edmond C Lau
(74) *Attorney, Agent, or Firm* — Studebaker & Brackett PC

(57) ABSTRACT

A liquid crystal display device is a curved liquid crystal display device including a liquid crystal panel which includes a liquid crystal, glass substrates which sandwich the liquid crystal, main spacers, and sub spacers. The main spacers come into contact with both of the glass substrates and keep an interval between the glass substrates. The sub spacers are arranged to come into contact with only one of the glass substrates, and, when the main spacers elastically deform and the interval between the glass substrates becomes close, come into contact with both of the glass substrates and keep the interval. The density of the main spacers per unit area in the display region is higher at a center portion than at both end portions in a curving direction of the liquid crystal panel.

18 Claims, 10 Drawing Sheets

(56) References Cited

U.S. PATENT DOCUMENTS

2014/0347614 A1* 11/2014 Asada .................. G02F 1/1337
                                                          349/123
2016/0231607 A1* 8/2016 Wu ....................... G02F 1/1339
2017/0192297 A1* 7/2017 Kwon ................... G02F 1/1341

* cited by examiner

FIG. 14

| THICKNESS OF GLASS SUBSTRATE | 0.5mm | 0.4mm | 0.3mm | 0.2mm | 0.1mm |
|---|---|---|---|---|---|
| VISUAL RECOGNITION EFFECT OF UNEVENNESS DURING CURVING | × | × | △ | ○ | ◎ |

× : VISUALLY RECOGNIZABLE WELL
△ : VISUALLY RECOGNIZABLE
○ : SLIGHTLY VISUALLY RECOGNIZABLE
◎ : NOT VISUALLY RECOGNIZABLE

F I G. 1 5
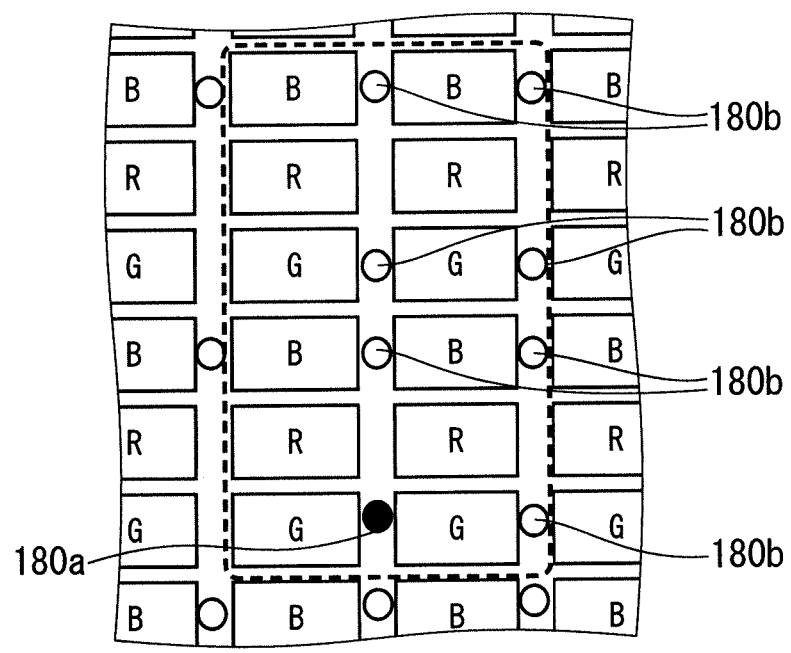

LIQUID CRYSTAL DISPLAY DEVICE AND METHOD FOR MANUFACTURING THE SAME

BACKGROUND OF THE INVENTION

Field of the Invention

The present invention relates to a liquid crystal display device and a liquid crystal display device manufacturing method. More particularly, the present invention relates to a curved liquid crystal display device which includes a curved liquid crystal panel, and a curved liquid crystal display device manufacturing method.

Description of the Background Art

From a viewpoint of design and space saving, a curved type display device is increasingly becoming necessary. Curved type display devices include a curved liquid crystal display device which is formed by curving a liquid crystal panel, and a curved organic EL display device which is formed by curving an organic EL panel.

A curved liquid crystal display device causes display unevenness due to the curved liquid crystal panel in some cases. This display unevenness is, for example, display unevenness (also referred to as "gap unevenness" below) caused when a cell gap becomes thick at both end portions in a curving direction of the liquid crystal panel. In addition, the display unevenness includes display unevenness (also referred to as "stress unevenness" below) caused when glass substrates which sandwich a liquid crystal is distorted, and photoelasticity due to this distortion causes leakage of light.

As measures for a gap unevenness, Japanese Patent Application Laid-Open No. 2004-126197 proposes, for example, a method for providing columnar spacers having uniform heights for keeping an interval between a pair of glass substrates which sandwich a liquid crystal, in such a distributed arrangement such that a distribution density at a center portion or a contact area per unit area is large compared to a surrounding portion of a liquid crystal panel.

On the other hand, in recent years, to both suppress failures due to an expansion of an operating temperature range of the liquid crystal display device, more specifically, a downward bulging failure which causes local display unevenness (also referred to as "gravity unevenness") at a lower side of the liquid crystal panel at a high temperature, and foaming failures which produce bubbles upon reception of a shock at a low temperature, and to secure robustness against an externally applied stress (e.g., finger press) to a display surface, a dual spacer structure which includes a mixture of two different types of columnar spacer modes is more frequently used.

More specifically, in this dual spacer structure, part of the columnar spacers are spacers of relatively high heights (referred to as "main spacers"), and the other part of the columnar spacers are spacers of relatively low heights (referred to as "sub spacers"). The main spacer comes into contact with both of opposing glass substrates and keeps an interval between the glass substrates in a normal time. On the other hand, the sub spacers come into contact with only one of the opposing glass substrates in the normal state where no external force is applied. The sub spacers do not contribute to keeping the interval between the glass substrates. When the external force elastically deforms the main spacer and the distance between the opposing glass substrates shortens, the sub spacers come into contact with both of the glass substrates and keep the interval between the glass substrates. Further, the main spacers and the sub spacers are formed to have the same height. Surface unevenness on portions that close to the opposing glass substrate are made different (e.g., a base pattern is formed opposing to the main spacer and the surface unevenness is made different according to the presence or absence of the base pattern). Thus, the main spacers and the sub spacers are separately formed in some cases.

SUMMARY OF THE INVENTION

The above described curved liquid crystal display device is often used to mount on vehicles. In-vehicle curved liquid crystal display devices have a wide operating temperature range than general liquid crystal display devices. Therefore, it is desired to apply the dual spacer structure to the curved liquid crystal display device. However, in order to effectively exhibit a function of the dual spacer structure, i.e., a function of suppressing failures such as downward bulging failures at a high temperature and foaming failures at a low temperature, it is necessary to appropriately select an area density of the main spacers, or a ratio between the main spacers and the sub spacers to control a compression deformation amount of the main spacers. Furthermore, as described above, in the curved liquid crystal display device, a stress applied to the columnar spacers makes a complicated behavior, and influences the compression deformation amount of the main spacers. Therefore, there is a problem that the curved liquid crystal display device has difficulty in obtaining the desired function of the dual spacer structure.

In view of such a problem, the above technique described in Japanese Patent Application Laid-Open No. 2004-126197 does not assume application of the dual spacer structure in particular to the curved liquid crystal display device. This technique does not disclose the structure of the columnar spacers which are necessary to effectively exhibit a function of the dual spacer structure, i.e., a function of suppressing failures such as downward bulging failures at a high temperature and foaming failures at a low temperature in the curved liquid crystal display device.

An object of the present invention is to suppress deterioration of display quality of a curved liquid crystal display device.

(Configuration)

A first aspect of a technique disclosed in this specification is a liquid crystal display device which includes a liquid crystal panel which displays a video image in a display region in a curved state. The liquid crystal panel includes a liquid crystal, a pair of glass substrates, a main spacer, and a sub spacer. A pair of glass substrates sandwich the liquid crystal. The main spacer comes into contact with both of a pair of glass substrates and keeps an interval between a pair of glass substrates. The sub spacer is arranged to come into contact with only one of a pair of glass substrates and, when the main spacer elastically deforms and the interval between a pair of glass substrates becomes closer, the sub spacer comes into contact with both of a pair of glass substrates and keeps the interval. In the display region, a density per unit area of the main spacer at a center portion in a curving direction of the liquid crystal panel is higher than the density of the main spacer at both end portions in the curving direction.

A second aspect of the technique disclosed in the specification of the present application is the liquid crystal display device which includes the liquid crystal panel which displays a video image in the display region in the curved state.

The liquid crystal panel includes a liquid crystal, a pair of glass substrates, a main spacer, and a sub spacer. A pair of glass substrates sandwich the liquid crystal. The main spacer comes into contact with both of a pair of glass substrates and keeps an interval between a pair of glass substrates. The sub spacer is arranged to come into contact with only one of a pair of glass substrates and, when the main spacer elastically deforms and the interval between a pair of glass substrates becomes closer, the sub spacer comes into contact with both of a pair of glass substrates and keeps the interval. In the display region, a height of the main spacer at the center portion in the curving direction of the liquid crystal panel is higher than a height of the main spacer at both end portions in the curving direction.

(Effect)

The first aspect of the technique disclosed in the specification of the present application includes the dual spacer structure in which the interval between a pair of glass substrates is kept by two spacers of the main spacers and the sub spacers. The density of the main spacers per unit area in the display region is higher at the center portion than at the both end portions in the curving direction of the liquid crystal panel. Consequently, a simple method for adjusting the density of the main spacers per unit area makes it possible to suppress failures such as downward bulging failures at a high temperature and foaming failures at a low temperature, and display unevenness such as gap unevenness.

The second aspect of the technique disclosed in the specification of the present application includes the dual spacer structure in which the interval between a pair of glass substrates is kept by two spacers of the main spacers and the sub spacers. The height of the main spacer in the display region is higher at the center portion than at the both end portions in the curving direction of the liquid crystal panel. Consequently, a simple method for adjusting the height of the main spacer makes it possible to suppress failures such as downward bulging failures at a high temperature and foaming failures at a low temperature, and display unevenness such as gap unevenness.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a view illustrating a relationship between the thickness of a glass substrate and display unevenness; and FIG. 15 is a view illustrating an arrangement of columnar spacers in the region R4 according to modified example 1.

DESCRIPTION OF THE PREFERRED EMBODIMENTS

Hereinafter, a preferred embodiment of the present invention will be described with reference to the drawings.

First Preferred Embodiment

<Configuration of Liquid Crystal Display Device>

Figure 1:
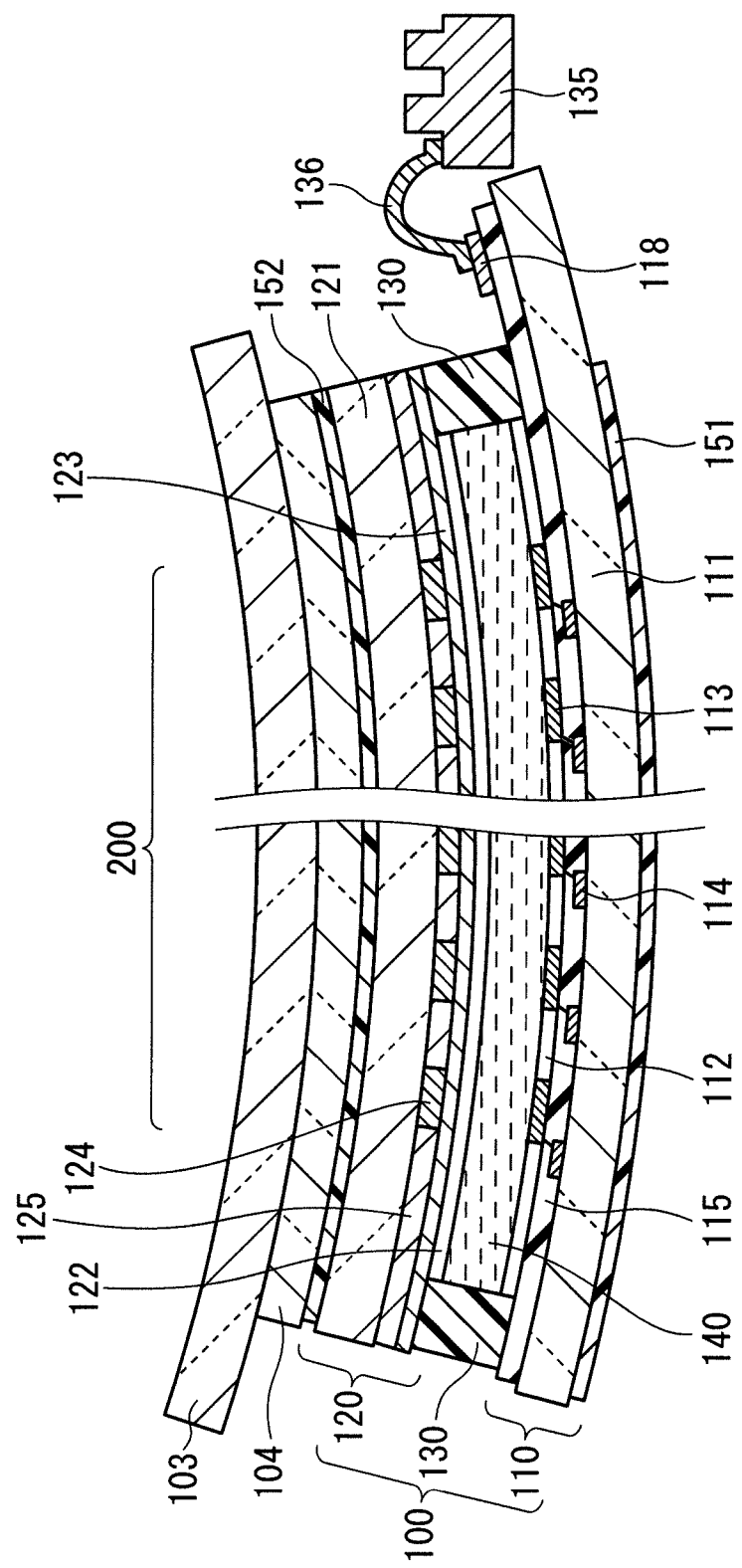
FIG. 1 is a cross-sectional view of a liquid crystal display device according to a first preferred embodiment.

FIG. 1 is a cross-sectional view schematically illustrating an example of the configuration of a liquid crystal display device 101 according to the first preferred embodiment of the present invention. The liquid crystal display device 101 is a curved liquid crystal display device. FIG. 1 illustrates a cross-sectional structure in a curving direction of the liquid crystal display device 101. In this regard, FIG. 1 is schematic and does not reflect the exact size of each component illustrated in FIG. 1. In addition, FIG. 1 does not illustrate repetitive of display pixels and partially simplifies a film configuration.

Here, an example will be described where the liquid crystal display device 101 is a liquid crystal display device which operates by using a TFT (Thin Film Transistor) as a switching element. As illustrated in FIG. 1, the liquid crystal display device 101 includes a liquid crystal panel 100 which is a main component, and a transparent protection cover 103 which is adhered to a front surface side of the liquid crystal panel 100 (i.e., a surface on which video images are displayed) via a transparent adhesive sheet 104. In the present preferred embodiment, the liquid crystal display device 101 has an external appearance curved at a predetermined curvature in a longitudinal direction such that a portion that closes to the transparent protection cover 103 is a concave surface. The liquid crystal display device 101 displays video images in a display region 200.

The liquid crystal panel 100 includes a TFT array substrate 110 (also referred to as an "array substrate 110" below) in which TFTs are aligned and disposed, and a color filter substrate 120 (also referred to as an "opposing substrate 120" below) which is disposed opposing to the array substrate 110.

The array substrate 110 and the opposing substrate 120 are bonded together by a sealing member 130 disposed between both of the substrates surrounding the display region 200, and made of resin. The liquid crystal 140 is sealed in a region surrounded by the sealing member 130 between the array substrate 110 and the opposing substrate 120. The liquid crystal 140 may be either a positive type or a negative type liquid crystal, and is filled such that a cell gap (i.e., the thickness of a liquid crystal layer) is, for example, 2 µm to 5 µm.

The array substrate 110 includes a glass substrate 111 which is a transparent substrate. Further, the array substrate 110 includes orientation films 112, pixel electrodes 113, TFTs 114, and an insulation film 115 on a surface of the glass substrate 111 on a portion that closes to the liquid crystal 140 in the display region 200.

Each orientation film 112 orients the liquid crystal 140 positioned thereabove. Each pixel electrode 113 is arranged at a lower portion of each orientation film 112 (i.e., a portion that closes to the glass substrate 111), and applies a voltage for driving the liquid crystal 140. Each TFT 114 supplies a voltage to each pixel electrode 113. The insulation film 115 covers each TFT 114. Further, the array substrate 110 includes a gate wire and a source wire (both are not illustrated) which are wires for supplying signals to the TFT 114.

Furthermore, the array substrate 110 includes, at an outside of the display region 200, a terminal 118 which receives from the outside an electrical signal supplied to each TFT 114, and a transfer electrode (not illustrated) which transmits the electrical signal input from the terminal 118 to the opposing electrode. Further, the array substrate 110 includes a polarizing plate 151 on a surface of the glass substrate 111 opposite to the liquid crystal 140.

The opposing substrate 120 includes a glass substrate 121 which is a transparent substrate. Further, the opposing substrate 120 includes an orientation film 122, a common electrode 123, color filters 124, and light shielding layers (also referred to as a "black matrix: BM") 125 on a surface of the glass substrate 121 on a portion that closes to the liquid crystal 140.

The orientation film 122 orients the liquid crystal 140 positioned thereabove. The common electrode 123 is disposed at a lower portion of the orientation film 122 (i.e., a portion that closes to the glass substrate 121), and generates an electric field between the common electrode 123 and the pixel electrode 113 on the array substrate 110 to drive the liquid crystal 140. Each color filter 124 and each light shielding layer 125 are arranged at a lower side (i.e., on the portion that closes to the glass substrate 121) of the common electrode 123. Further, the opposing substrate 120 includes a polarizing plate 152 on a surface of the glass substrate 121 opposite to the liquid crystal 140.

The polarizing plates 151 and 152 are, for example, general iodine-based polarizing plates, and are disposed so that absorption axes are orthogonal at the top and bottom. In case where the liquid crystal panel 100 is a liquid crystal panel of a lateral electric field type (more specifically, for example, an FFS (Fringe Field Switching) scheme), an orientation direction of the liquid crystal 140 is the same as the absorption axis direction of one of the polarizing plates, and the liquid crystal 140 is homogeneously oriented.

The glass substrates 111 and 121 are made thin to approximately 0.2 mm to have flexibility. Instead of the glass substrates 111 and 121, a substrate made of a material other than glass may be used as long as the substrate has flexibility. When, for example, the liquid crystal panel 100 is a transmissive liquid crystal panel, a transparent substrate made of another material such as transparent plastic or quartz which is a transparent material may be used. Further, when the liquid crystal panel 100 is a reflective liquid crystal panel, one substrate may be a silicon substrate and does not need to be a transparent substrate. However, in the present preferred embodiment, the glass substrate is selected and is set to the thickness of 0.15 mm in consideration of a balance between visibility of unevenness due to distortion and easiness of processing as described below.

A plurality of columnar spacers (not illustrated) which keeps a distance between both of the substrates at a fixed distance is disposed between the array substrate 110 and the opposing substrate 120. The columnar spacers will be described later in detail.

The transfer electrode and the common electrode 123 are electrically connected by a transfer member (not illustrated), and the electrical signal input from the terminal 118 is transmitted to the common electrode 123.

In addition, the liquid crystal panel 100 includes a control substrate 135 which includes a driving IC (Integrated Circuit) which generates a driving signal, and a FFC (Flexible Flat Cable) 136 which electrically connects the control substrate 135 to the terminal 118. In this regard, in the example in FIG. 1, the terminals 118, the control substrate 135 and the FFC 136 are connected to only one end in the curving direction of the liquid crystal panel 100. However, the terminal 118 may be disposed on a plurality of sides (e.g., two sides of the array substrate 110) of the liquid crystal panel 100 as described below. Further, when the terminal 118 is disposed on only one side of the liquid crystal panel 100, the terminal 118 may be configured to be disposed on a side on which the liquid crystal panel 100 is curved or to be disposed on a side on which the liquid crystal panel 100 is not curved.

Further, in the liquid crystal display device 101, a backlight unit (not illustrated) which is a light source is disposed so as to oppose to the array substrate 110 from a portion that closes to the polarizing plate 151. As a backlight unit used herein, a backlight unit matching the curved liquid crystal panel 100 is used. Between the liquid crystal panel 100 and the backlight unit, an optical sheet (not illustrated) for controlling a polarization state and directivity of the light from the backlight is disposed.

The liquid crystal panel 100, and members such as the transparent protection cover 103 and the transparent adhesive sheet 104 which are explained earlier and compose the liquid crystal display device 101 are accommodated in a housing (not illustrated) such that at least a portion of the transparent protection cover 103 which is on a side opposite to the liquid crystal panel 100 and corresponds to the display region 200 is exposed.

When the liquid crystal display device 101 operates, for example, an electrical signal is input from the control substrate 135, a drive voltage is applied to the pixel electrode 113 and the common electrode 123, and a direction of molecules of the liquid crystal 140 changes according to the drive voltage. Then, light emitted from the backlight unit is transmitted toward to an observer or blocked via or by the array substrate 110, the liquid crystal 140, and the opposing substrate 120, so that a video image is displayed in the display region 200.

In this regard, the configuration of the liquid crystal panel 100 described above is an exemplary configuration and may be other configurations. The operation mode of the liquid crystal panel 100 assumes a TN (Twisted Nematic) mode. However, the common electrode 123 provided on the opposing substrate 120 may be disposed on the portion that closes to the array substrate 110, and the liquid crystal panel 100 may be a liquid crystal panel which uses a lateral electric field scheme such as a FFS scheme which applies an electric field to the liquid crystal 140 in a lateral direction between the common electrode 123 and the pixel electrode 113. In particular, when the liquid crystal panel which uses the lateral electric field scheme is used, a change in display characteristics is sensitive to a change in cell gap. Gap unevenness caused by a curve is easily visually recognized as display unevenness. The effect obtained by applying the present invention can be remarkably obtained.

It is also possible to substitute a transfer member with a mixture of conductive particles into the sealing member 130 and to omit the transfer member. A driving IC is connected to the terminal 118 disposed on the control substrate 135. However, a terminal of the driving IC may be disposed directly on the terminal 118 to be directly connected to the terminal 118.

In addition, in the sealing member 130, an injection port for injecting the liquid crystal 140 is not illustrated. When a vacuum injection method for injecting the liquid crystal 140 from the injection port in vacuum is used as a method for injecting the liquid crystal 140, the injection port and a sealant for sealing the injection port are formed. In addition, when a one drop fill scheme (also referred to as "ODF scheme" below) is used in which the liquid crystal 140 is disposed on the array substrate 110 or the opposing substrate 120 in a droplet form, and these substrates are bonded in vacuum, it is possible to omit the inlet port and the sealant. The method for injecting the liquid crystal 140 by the one drop fill scheme will be described later in detail.

<Columnar Spacer>

Figure 2:
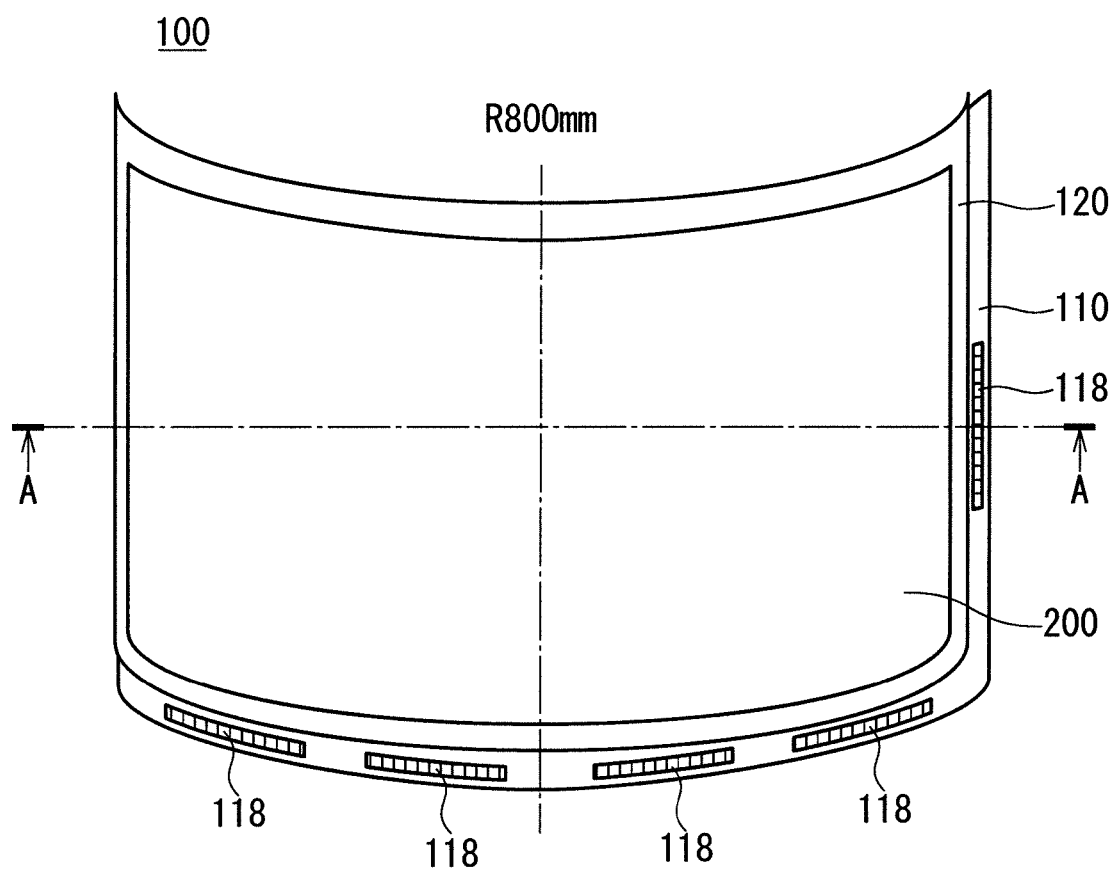
FIG. 2 is a perspective view of a liquid crystal panel according to the first preferred embodiment.
Figure 3:
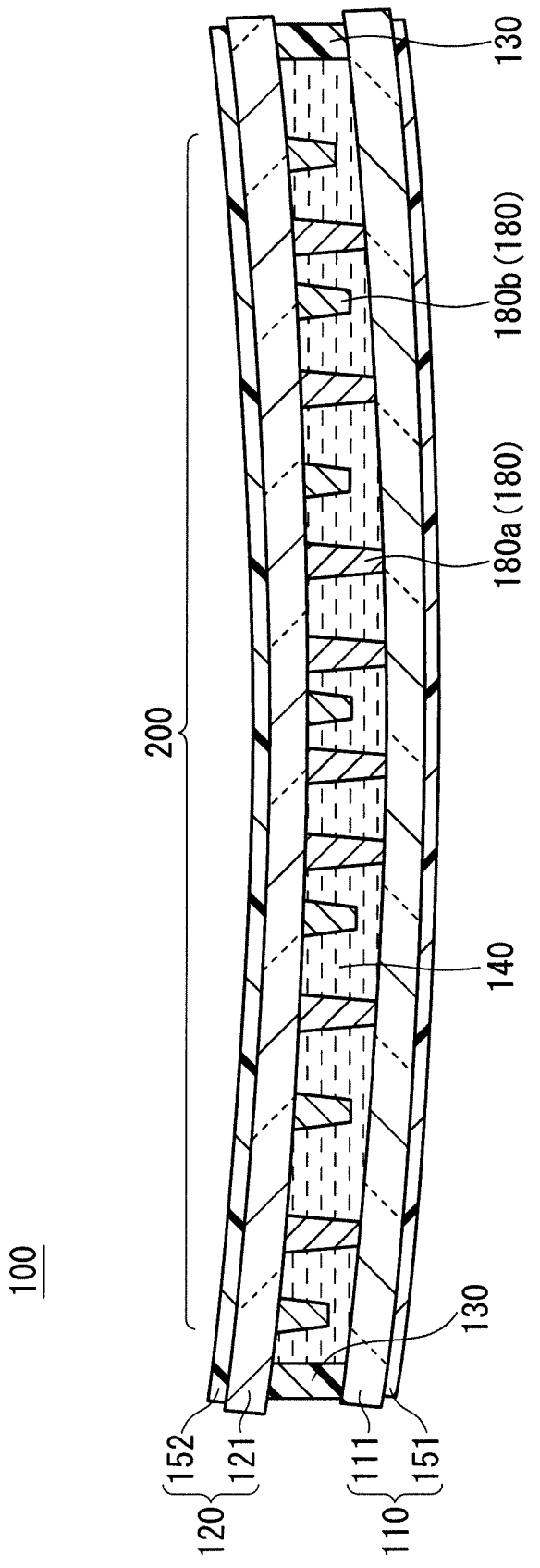
FIG. 3 is a cross-sectional view of the liquid crystal panel according to the first preferred embodiment.
Figure 4:
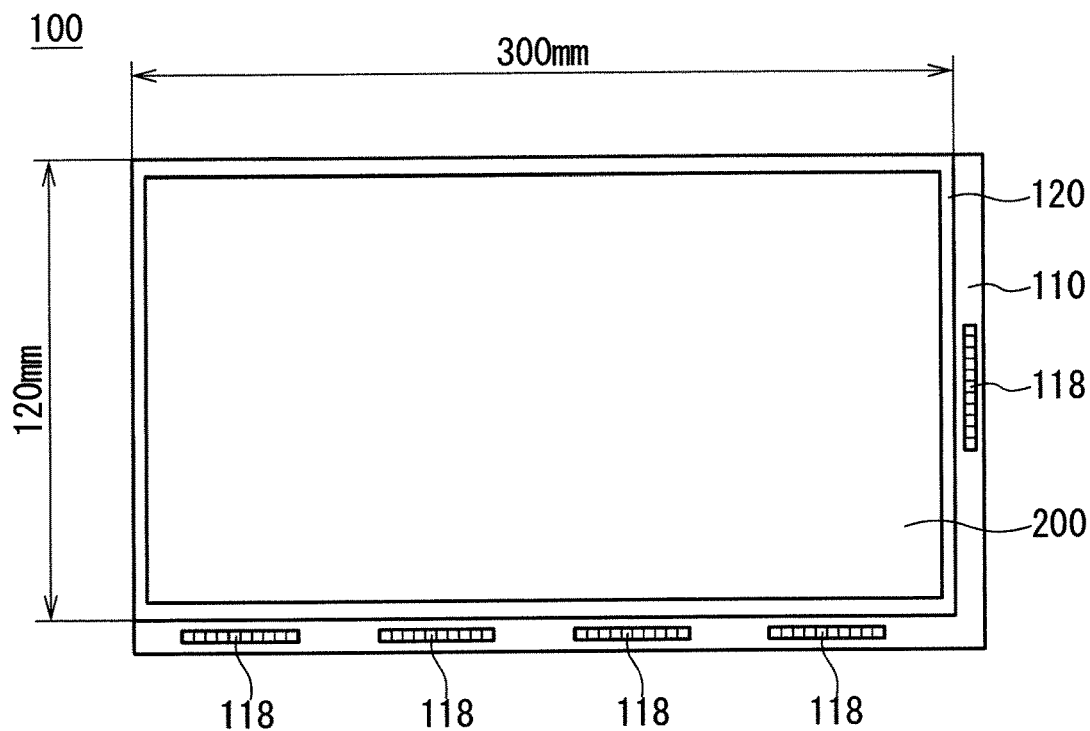
FIG. 4 is a plan view of a flat state of the liquid crystal panel according to the first preferred embodiment.

Hereinafter, the columnar spacers included in the liquid crystal panel 100 will be described in detail. FIG. 2 is a perspective view schematically illustrating an example of the configuration of the liquid crystal panel 100 included in the liquid crystal display device 101 according to first preferred embodiment of the present invention. FIG. 3 is a cross-sectional view taken along a line A-A illustrated in FIG. 2. FIG. 4 is a plan view illustrating an external appearance of the liquid crystal panel 100 in a state where the liquid crystal panel 100 is flat before being curved. In FIG. 2 to FIG. 4, the same components as those described in the previous drawing will be assigned the same reference numerals, and will not be described. In addition, part of the components described with reference to the previous drawing will not be illustrated. This also applies to the following drawings.

In the liquid crystal panel 100 according to the present preferred embodiment, for example, the thickness of each of the glass substrates 111 and 121 is 0.15 mm (±20%). Further, for example, as illustrated in FIG. 4, the liquid crystal panel 100 has a rectangular shape in a plan view in a state where the liquid crystal panel 100 is flat before being curved. In the present preferred embodiment, a rectangular substrate whose external size of the opposing substrate 120 is 300 mm×120 mm is used. For the sake of convenience of explanation, an example of a rectangular shape is used. However, the outer shape of the liquid crystal panel 100 is not limited to the rectangular shape and liquid crystal panels of different types having a circular shape, an elliptical shape or a polygonal shape, and a partially curved external shape may be used.

The liquid crystal panel 100 is curved in the longitudinal direction from a flat state as illustrated in FIG. 4, and becomes the curved liquid crystal panel as illustrated in FIGS. 1 to 3. In the present preferred embodiment, the liquid crystal panel 100 is curved at a curvature of R800 mm.

As illustrated in FIG. 3, a plurality of columnar spacers (also referred to as "PSs (post spacers)") 180 is disposed between the array substrate 110 and the opposing substrate 120.

The columnar spacers 180 are columnar spacers formed by patterning a resin on the array substrate 110 or the opposing substrate 120. In the present preferred embodiment, two types of the columnar spacers 180 having different heights are disposed on the opposing substrate 120 in a predetermined arrangement at a predetermined density according to the region in a dual spacer structure. The dual spacer structure more specifically includes the columnar spacers 180 (also referred to as main spacers 180a below) having relatively high heights (the film thickness is thick or long in other words), and the columnar spacers 180 (also referred to as "sub spacers 180b" below) having relatively low heights. The main spacers 180a are in contact with both of the array substrate 110 and the opposing substrate 120 at all times to keep the interval between both of the substrates. The sub spacers 180b come into contact with only one of the array substrate 110 and the opposing substrate 120 in the normal state where no external force is applied, and when an external force is applied, and when the main spacers 180a elastically deform and the interval between the substrates becomes close, the sub spacers 180b come into contact with both of the substrates and keep the interval between both of the substrates.

As illustrated in FIG. 3, the main spacers 180a are disposed in the display region 200 such that the density increases toward the center portion in the curving direction of the liquid crystal panel 100. Hereinafter, the arrangement of the main spacers 180a and the sub spacers 180b will be described in more detail.

Figure 5:
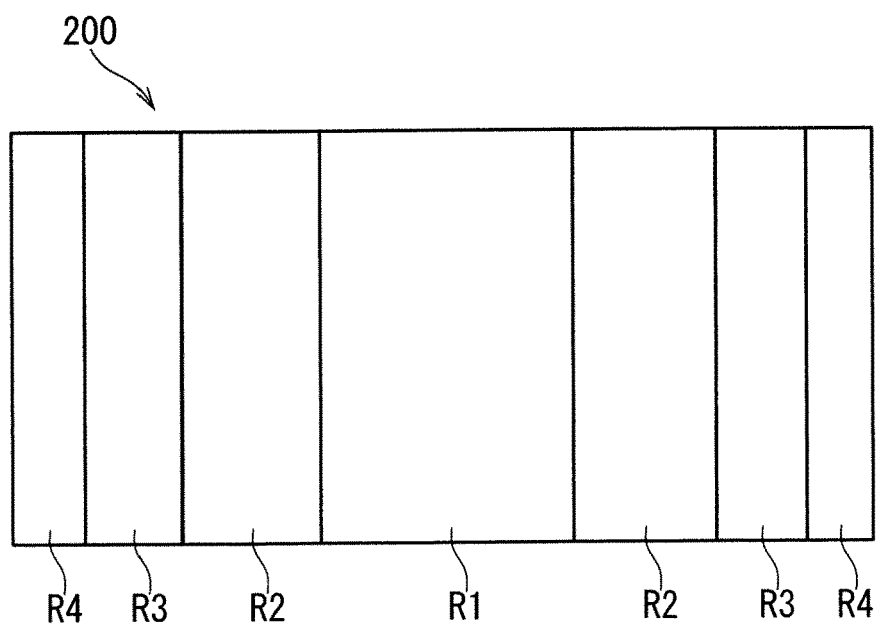
FIG. 5 is a view for explaining a density distribution of columnar spacers.

FIG. 5 is a view for explaining a density distribution of the columnar spacers 180 in the display region 200. In FIG. 5, for example, in the liquid crystal panel 100, and actually in the display region 200 in which the columnar spacers 180 are mainly disposed, a center portion in the curving direction of the liquid crystal panel 100 is a region R1, both sides of the region R1 are defined as regions R2, outer sides of the regions R2 are regions R3, and region outside the regions R3 (i.e., both end portions in the curving direction in the display region 200) are regions R4. The density of the main spacers 180a is fixed in each of the regions R1 to R4. Further, the density of the main spacers 180a is maximum in the region R1 at the center portion and decreases sequentially toward the regions at the outer side. Conversely speaking, the density of the main spacers 180a is minimum in the regions R4 at the both end portions in the curving direction in the display region 200, and is higher toward the region R1 at the center portion. That is, the density of the main spacers 180a has a relationship of the region R1>the regions R2>the regions R3>the regions R4.

The density of the main spacers 180a corresponds to an area density (i.e., an area occupied by the main spacers 180a per unit area). Therefore, it is generally possible to adjust the density by varying individual sizes (i.e., the diameter of the circular shape) of the individual main spacers 180a formed in circular shapes when seen from a top view and disposing the individual main spacers 180a. However, the diameter of the main spacer 180a is often determined as a predetermined value due to some restrictions. In practice, by changing the number of the main spacers 180a disposed per unit pixel number (i.e., the ratio of the number of pixels in which the main spacers 180a are disposed with respect to the unit pixel number) as described below, the density of the main spacers 180a may be adjusted.

Figure 6:
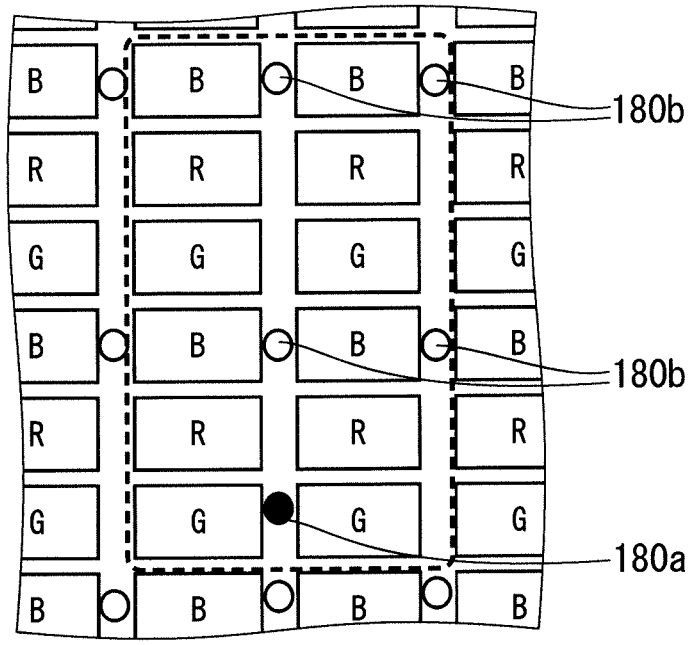
FIG. 6 is a view illustrating an arrangement of the columnar spacers in a region R4 according to the first preferred embodiment.
Figure 7:
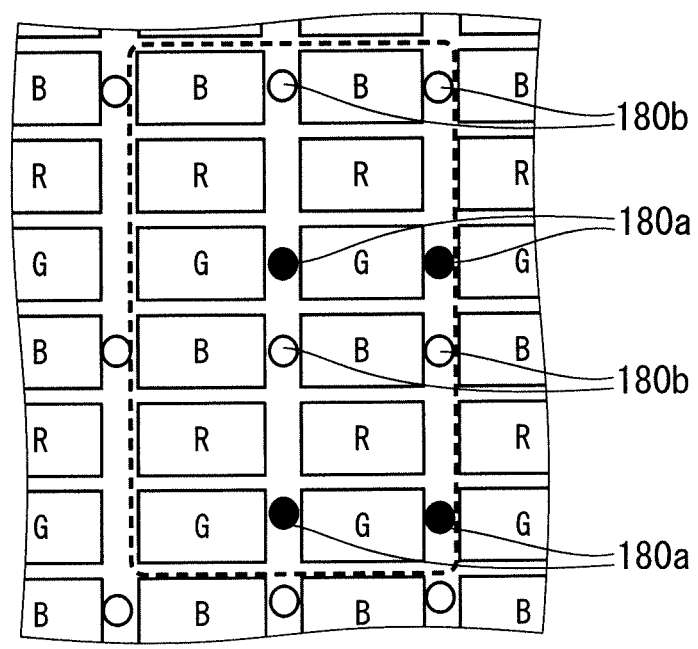
FIG. 7 is a view illustrating an arrangement of the columnar spacers in a region R1 according to the first preferred embodiment.

FIGS. 6 and 7 are views illustrating examples of the arrangement of the main spacers 180a and the sub spacers 180b in the regions R4 and R1 illustrated in FIG. 5. FIGS. 6 and 7 illustrate a plurality of pixels which is aligned in the display region 200 and each forms a set of pixels of three colors of R (red), G (green), and B (blue). In addition, one of the unit pixels (12 pixels) in the present preferred embodiment is surrounded by a broken line for illustration.

As illustrated in FIG. 6, the main spacer 180a is disposed in one pixel of every 12 pixels in the regions R4 which are the both end portions in the curving direction of the display region 200. Meanwhile, as illustrated in FIG. 7, the main spacers 180a are disposed in four pixel of every 12 pixels in the region R1 which is the center portion in the curving direction of the display region 200. In addition, the number of pixels in which the main spacers 180a are disposed is increased stepwise from the region R4 to the region R1. As illustrated in FIGS. 6 and 7, the sub spacers 180b are disposed in all B (blue) pixels. An arrangement density of the sub spacers 180b is not changed from the region R4 to the region R1, and the sub spacers 180b are disposed at a rate of four pixels of every 12 pixels. On the other hand, a ratio for disposing the main spacers 180a in the G (green) pixels in which the sub spacers 180b are not disposed is changed as described above. That is, when the density of the main spacers 180a is changed and adjusted in the plane, the density is adjusted by changing the number of the main spacers 180a disposed in the pixels of the color in which the sub spacers 180b are not disposed without changing the arrangement of the sub spacers 180b in the plane.

Adoption of this adjustment method provides the following advantages. In this regard, the appropriate density and arrangement ratio of the main spacers 180a are changed according to a situation such as the size or the degree of curve (i.e., the curvature of the curve) of the liquid crystal panel 100. Therefore, it is necessary to design each device while adjusting the size or the degree of curving of each device. During adjustment of the density of the main spacers 180a for such a design, it is possible to freely adjust the density of the main spacers 180a to be varied in the plane while fixing the arrangement design of the sub spacers 180b. It is easy to change the design related to the arrangement and density adjustment of the main spacers 180a corresponding to each device.

The above-described examples of FIGS. 6 and 7 are exemplified to describe the conceptual aspect of the invention. A scale of the absolute value of the density of the columnar spacers 180 to be set in each region is not indicated. For example, the arrangement rate varies according to the relationship between one pixel area and the area (size/diameter) of one columnar spacer 180.

Figure 8:
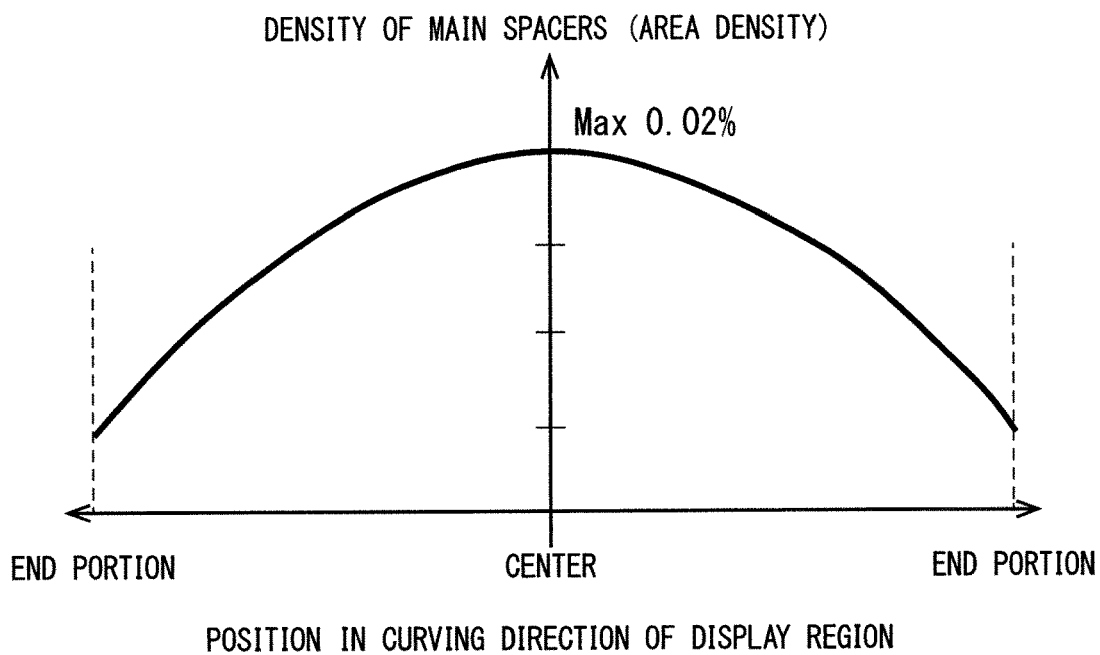
FIGS. 8 and 9 are views illustrating a density distribution of main spacers.

Next, a specific setting example of the area density of the main spacers 180a and the sub spacers 180b will be described. FIG. 8 is a view illustrating an example of the density distribution of the main spacers 180a. FIG. 8 illustrates the relationship between the position in the curving direction of the display region 200 and the area density of the main spacers 180a. As illustrated in FIG. 8, in the present preferred embodiment, the absolute value of the area density for disposing the main spacers 180a is desirably set such that the area density (the area occupied by the main spacers 180a per unit area) is 0.02% at the curved portion of the liquid crystal panel 100, i.e., at the center portion in the longitudinal direction of the display region 200, and the area density moderately decreases outward. Further, the area density of the main spacers 180a may be set to fluctuate within the range of 0.005% to 0.02% such that the density range from the center portion to the both end portions are the density range which effectively functions the dual spacer structure. On the other hand, in the present preferred embodiment, the area density of the sub spacers 180b is set as the density which provides desired robustness in case where a plane pressing stress is applied to the liquid crystal panel 100 to fixed 0.1% regardless of places (not illustrated).

In the specific setting example related to the density distribution of the main spacers 180a illustrated in FIG. 8, the desired density distribution of the main spacers 180a corresponds to the stress which continuously fluctuates according to the position in the curving direction. However, as described earlier in the adjustment example, use of a method for making adjustment by changing the number (ratio) of the columnar spacers 180 to be disposed makes it difficult to perform such analog adjustment. Meanwhile, alleviation of a stress realized by adjusting the density of the main spacers 180a becomes sufficiently effective by making adjustment within a certain range. Consequently, as described conceptually with reference to FIG. 5 first, the display region 200 may be partitioned and the density may be adjusted stepwise.

Figure 9:
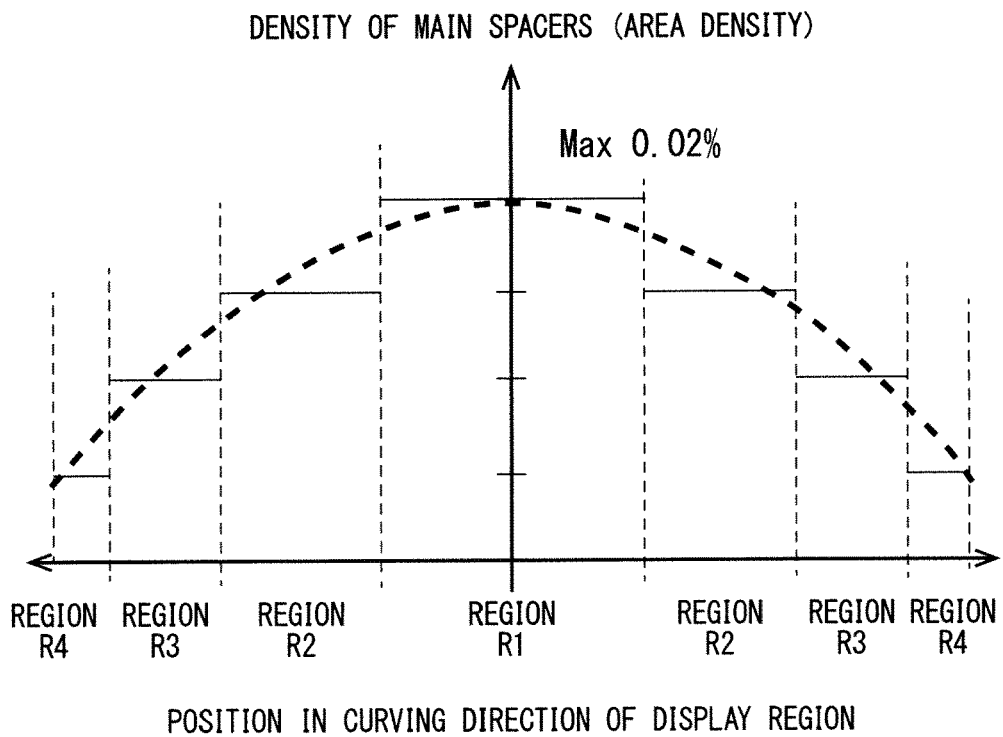

FIG. 9 is a view illustrating an example of the density distribution of the main spacers 180a. FIG. 9 illustrates the density distribution illustrated in FIG. 8 as a broken line. As illustrated in FIG. 9, the area density may be set to a maximum density at the center portion of the curved portion of the liquid crystal panel 100, and the area density may be set to decrease stepwise outward. The setting value of the specific density in each region also varies according to how division is performed. Similar to the example in FIG. 8, for example, the density may be set to 0.02% at the center portion. Further, assuming that the density is adjusted by the number of disposed main spacers 180a, the density change fluctuates per fixed value. For example, in the example of FIG. 9, the density of the main spacers 180a is gradually decreased from the region R1 to the region R4 in order of 0.02%, 0.015%, 0.01%, 0.005% at an order of 0.005%. Naturally, the regions to be divided may be further subdivided, and in this case, the density fluctuates more finely stepwise.

<Function and Effect>

Subsequently, the function and the effect obtained by the liquid crystal display device 101 according to first preferred embodiment will be described in detail.

A force in a compression direction applied to the main spacers 180a in case where the liquid crystal panel having a length of 300 mm and having a fixed density of the main spacers 180a in the plane is curved at R800 mm in a longitudinal direction will be studied. As described with reference to FIG. 3, when the liquid crystal panel 100 is curved in the longitudinal direction, the two glass substrates 111 and 121 are curved with a surrounding portion fixed by the sealing member 130. Therefore, a tensile stress which causes pulling toward the outside of the substrate acts on the glass substrate 111 disposed on a convex surface side of one curved surface. A compression stress which causes compression toward an inside of the substrate acts on the glass substrate 121 disposed on a concave surface side of the other curved surface. It is found that, as a result, a force in a direction to narrow the interval between the two substrates acts between the two glass substrates 111, 121, and the force maximizes at the curved portion in the liquid crystal panel 100, i.e., at the center portion in the curving direction, and decreases toward the surrounding portion fixed by the sealing member 130.

The force in the direction which acts between the glass substrates 111 and 121 and narrows the interval between both of the substrates corresponds to the force in the compression direction applied to the main spacers 180a. Therefore, the force for compressing the main spacer 180a becomes stronger at the curved portion of the liquid crystal panel 100, i.e., at the center portion in the curving direction than at the other portion. The force for compressing the main spacers 180a becomes weaker toward the surrounding portion. A distribution of the force varies a compression deformation amount of the main spacers 180a per position in the plane position. Therefore, gap unevenness causes a display failure in some cases when the liquid crystal panel is curved.

Figure 10:
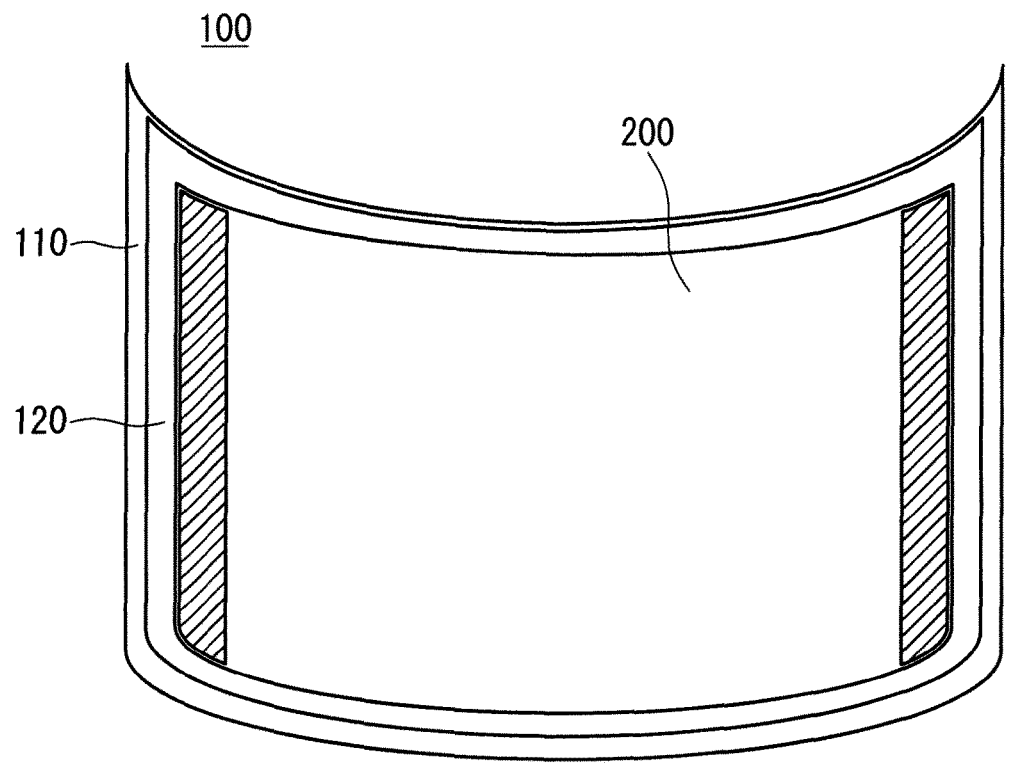
FIG. 10 is a view for explaining gap unevenness.

FIG. 10 is a view for explaining the gap unevenness. FIG. 10 illustrates portions at which the gap unevenness is likely to occur as shaded areas. As illustrated in FIG. 10, the cell gap becomes thick at the both end portions in the curving direction of the liquid crystal panel 100. Therefore, the gap unevenness is more likely to occur at the both end portions. For example, the gap unevenness is visually recognized as a yellow ting when the liquid crystal panel 100 displays video images of a halftone to white.

Hence, the liquid crystal display device 101 according to first preferred embodiment changes the density of the main spacers 180a as illustrated in FIGS. 8 and 9 according to the force distribution. Consequently, it is possible to keep the fixed cell gap, and to suppress occurrence of the gap unevenness.

Furthermore, results of various studies experimentally show that setting the density of the main spacer 180a to 0.02% or less does not produce unevenness in a stress generated between the glass substrates irrespective of the compression deformation amount of the main spacers 180a.

Figure 11:
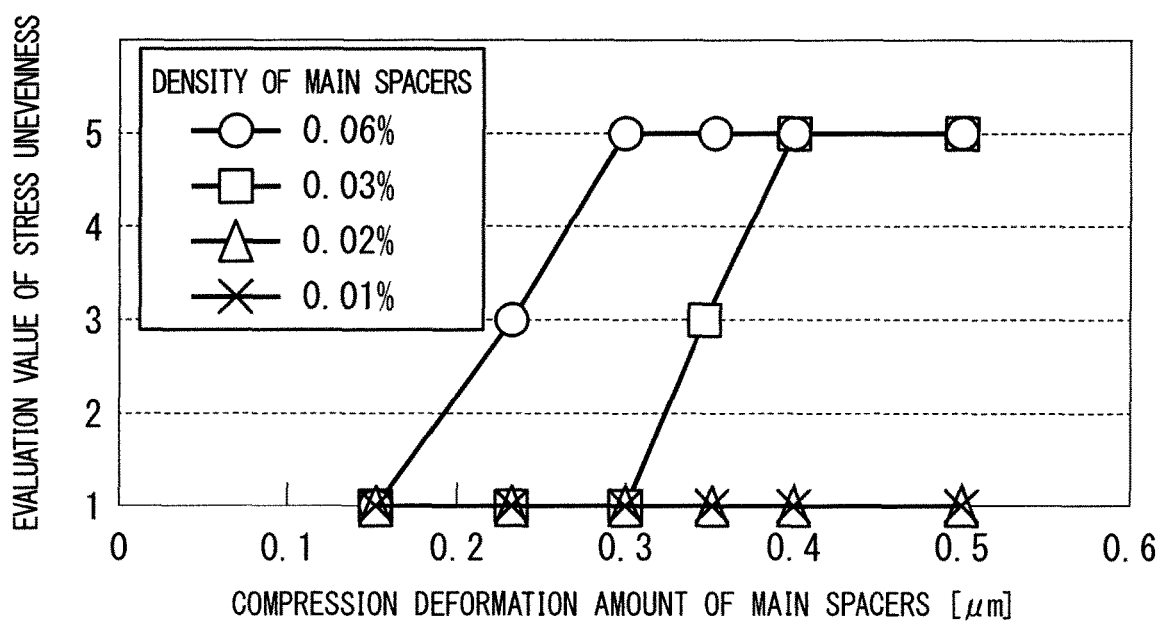
FIG. 11 is a view illustrating a relationship between compression deformation amount of the main spacers and the stress unevenness.

FIG. 11 is a view illustrating a relationship between the compression deformation amount of the main spacers 180a and stress unevenness. In FIG. 11, the vertical axis indicates a value obtained by evaluating the density of the stress unevenness at five levels, and a larger numerical value indicates that a more dense stress unevenness can be visually recognized. For example, "evaluation value 5" indicates a result that the dense stress unevenness is visually recognized. "Evaluation value 1" indicates a result that stress unevenness cannot be visually recognized.

Figure 12:
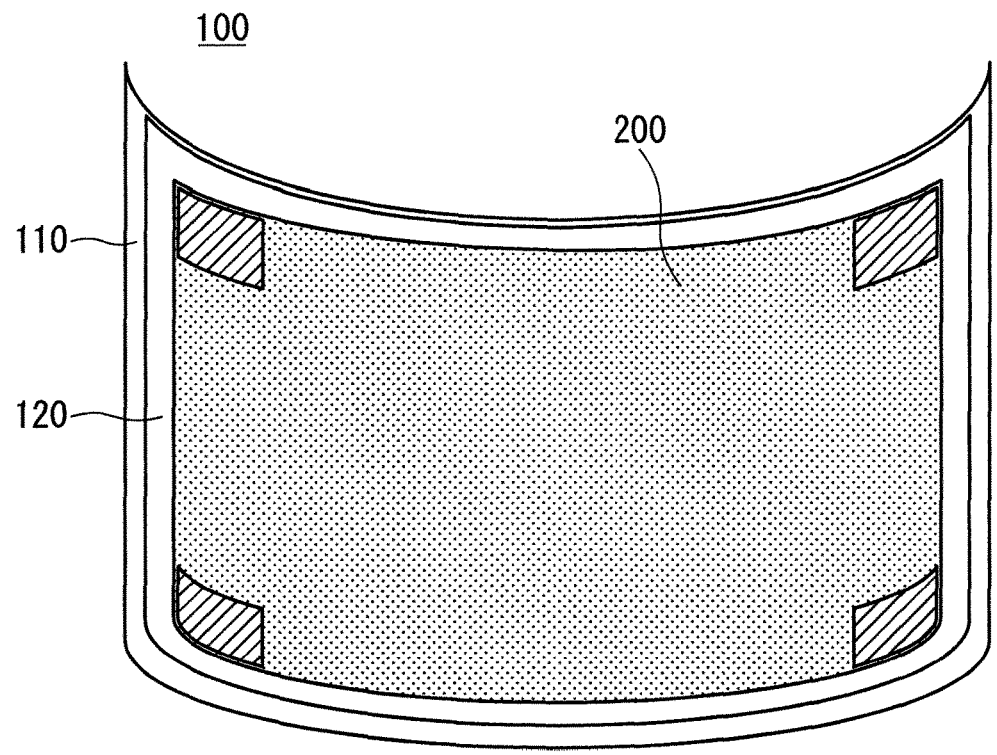
FIG. 12 is a view for explaining the stress unevenness.

FIG. 12 is a view for explaining the stress unevenness. FIG. 12 illustrates portions at which the stress unevenness is likely to occur as shaded regions. When the liquid crystal panel 100 is curved and thereby the cell gap narrows at the center portion in the curving direction, distortion caused by an increase in thickness of the cell gap at the surrounding portion entirely acts on the liquid crystal panel 100, and the stress concentrates at the surrounding portion fixed by the sealing member 130 in particular, more particularly, at four corners of the liquid crystal panel 100, the stress unevenness is more likely to occur at these four corners. For example, the stress unevenness is visually recognized as a white spot when the liquid crystal panel 100 displays video images of black to a low gradation.

As illustrated in FIG. 11, when the density of the main spacers 180a is 0.06% and 0.03%, as the compression deformation amount of the main spacers 180a becomes larger, the stress unevenness is more likely to be visually recognized. On the other hand, when the density of the main spacer 180a is 0.02% and 0.01%, it is possible to suppress the stress unevenness irrespectively of the compression deformation amount of the main spacers 180a. In this case, foaming at a low temperature is also evaluated, yet foaming does not occur under any conditions. This is because the contraction of the main spacers 180a can also follow contraction of the liquid crystal 140. According to these results, by setting the density of the main spacers 180a to 0.02% or less at maximum and changing the density of the main spacers 180a according to the force distribution applied during curving, it is possible to suppress not only occurrence of the gap unevenness but also generation of bubbles due to the stress unevenness while black is displayed and a shock at a low temperature.

Figure 13:
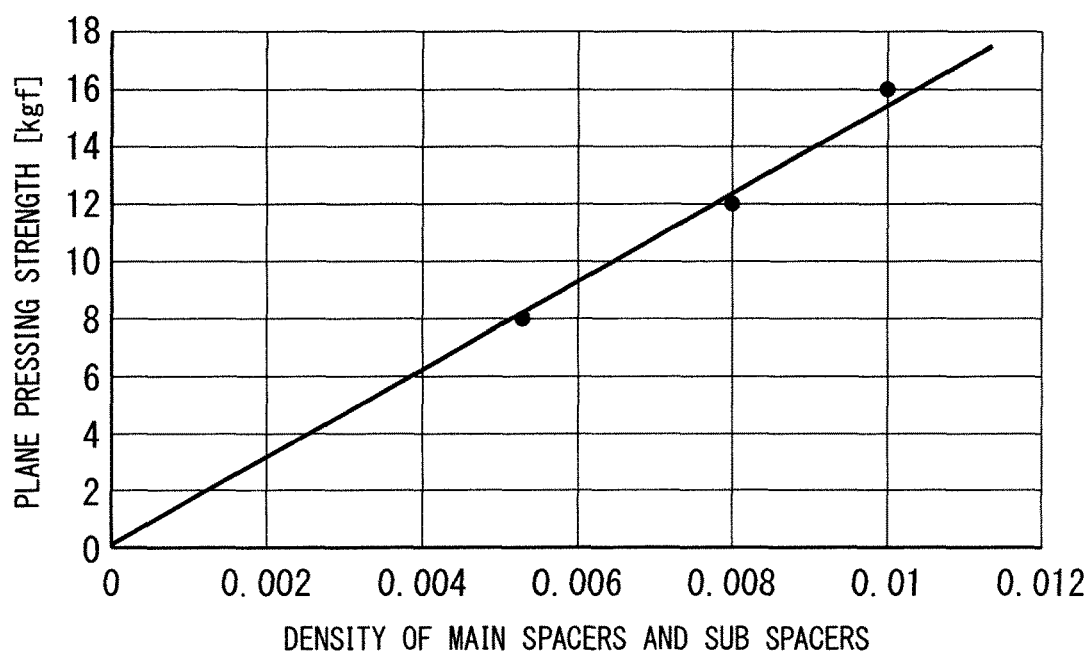
FIG. 13 is a view illustrating a relationship between a density of the main spacers and sub spacers and plane pressing strength.

On the other hand, a decrease in the density of the main spacers 180a is likely to cause the gap unevenness due to the pressing pressure from the outside. Therefore, by forming the sub spacers 180b having the heights lower than the main spacers 180a, it is possible to obtain the strength which is robust against the pressing pressure from the outside. FIG. 13 is a view illustrating the relationship between the density of the main spacers 180a and the sub spacers 180b and plane pressing strength. FIG. 13 illustrates a measurement result obtained by measuring a pressing pressure when gap unevenness is caused by pressurizing the liquid crystal panel 100 by using a pushable gauge of 10 mm in diameter. The plane pressing strength having approximately 10 kgf or more is sufficient strength against plane pressing. Yet, as illustrated in FIG. 13, the density of the main spacers 180a and the sub spacers 180b with 0.6% or more is sufficient.

Further, the stress unevenness mainly caused at the four corners when the liquid crystal panel 100 is curved is fundamentally caused as described above by concentration of the stress at the four corners of the liquid crystal panel 100 in particular. Consequently, by optimizing the dual spacer structure as described above, it is possible to alleviate the overall distortion of the liquid crystal panel 100, and to obtain an improvement effect for the stress unevenness occurring at the four corners. Furthermore, the stress unevenness is caused by an interaction between an increase in the stress at the four corners and the photoelasticity of the glass substrates 111 and 121. Consequently, by optimizing the dual spacer structure, and reducing a phase difference produced in the glass substrates 111 and 121, it is possible to further increase the improvement effect. The phase difference between the glass substrates 111 and 121 which causes a problem is generally known to be proportional to the photoelastic constant and the thickness. Therefore, a prototype is made by changing the thicknesses of the glass substrates 111 and 121 within the range of 0.5 mm to 0.1 mm.

FIG. 14 is a view illustrating a relationship between the thicknesses of the glass substrates 111 and 121 and the evaluation result of display unevenness. FIG. 14 illustrates the result obtained by evaluating a display unevenness occurrence result at four levels when the thicknesses of the glass substrates 111 and 121 are changed at the order of 0.1 mm within the range of 0.1 mm to 0.5 mm. Cross marks, a triangle mark, a circle mark, and a double circle mark in FIG. 14 indicate the display unevenness evaluation result such as "visually recognizable well", "visually recognizable", "slightly visually recognizable" and "not visually recognizable", respectively.

As illustrated in FIG. 14, when the thicknesses of the glass substrates 111 and 121 become approximately 0.2 mm or less, the display unevenness is improved. When the thicknesses become 0.1 mm, the display unevenness is not visually recognized, and video images are favorably obtained. On the other hand, when the thicknesses of the glass substrates 111 and 121 are too thin, such as less than 0.1 mm, it is difficult to process the glass substrates 111 and 121, which leads to lower the manufacturing yield, and to cause an increase in manufacturing cost. Therefore, when the thicknesses of the glass substrates 111 and 121 are at least 0.2 mm or less and more preferably 0.15 mm which is 0.1 mm or more, display unevenness does not occur and manufacturing cost is suitable.

As described above, the liquid crystal display device 101 according to the first preferred embodiment optimizes the arrangement of the dual spacer structure. Consequently, even when the liquid crystal display device 101 is used in a wide temperature range, the dual spacer structure functions properly. It is possible to suppress generation of bubbles due to stress unevenness during display and a shock at a low temperature, and to suppress downward bulging failures at a high temperature. Consequently, when the liquid crystal display device 101 is used in the wide temperature range, it is possible to suppress generation of bubbles and occurrence of display unevenness. Further, an appropriate arrangement of the dual spacer structure is adopted according to the distribution of the force applied during curving. Consequently, it is possible to obtain the curved liquid crystal display device which suppresses unevenness even when white, a halftone or black is displayed, i.e., suppress a decrease in display quality.

Various Modified Examples

Various modified examples of the first preferred embodiment of the present invention will be described below.

Modified Example 1

First, a liquid crystal display device according to modified example 1 of the first preferred embodiment which is another preferred embodiment to which the present invention is applied will be described. This modified example is a change example of a method for adjusting a distribution density by a specific arrangement of main spacers 180a and sub spacers 180b compared with the first preferred embodiment. Hereinafter, changes from the first preferred embodiment will be described, and portions other than the changes will not be described as appropriate.

FIG. 15 is a view corresponding to FIG. 6 in the first preferred embodiment, and is a view illustrating an example of the arrangement of the main spacers 180a and the sub spacers 180b in a region R4 illustrated in FIG. 5. A region R1 is the same as that described with reference to FIG. 7 in the first preferred embodiment, and therefore is not illustrated. In this modified example, as illustrated in FIG. 15, in the region R4, the main spacer 180a is disposed in one pixel of every 12 pixels, and the sub spacers 180b are arranged in seven pixels of every 12 pixels. In the region R1, the main spacers 180a are disposed in four pixels of every 12 pixels, and the sub spacers 180b are disposed in four pixels of every 12 pixels. The sub spacers 180b are not disposed in the pixels in which the sub spacers 180b are disposed stepwise from the region R4 to the region R1. Instead, the main spacers 180a are disposed at these positions to increase the number of pixels in which the main spacers 180a are disposed.

More specifically, the positions at which the main spacers 180a or the sub spacers 180b are disposed are determined as B (blue) and G (green) pixels. The arrangement density of the columnar spacers 180 (a total arrangement density of the main spacers 180a and the sub spacers 180b) in the regions R1 to R4 is eight pixels of every 12 pixels and is fixed. On the other hand, the main spacer 180a is disposed in one G (green) pixel of every 12 pixels in the region R4. The sub spacer 180b disposed in the G (green) pixel to the region R1 in order is replaced with main spacer 180a. Main spacers 180a are disposed in all G (green) pixels in the region R1. The main spacers 180a are disposed in four pixels of every 12 pixels.

That is, when the density of the main spacers 180a is changed to be adjusted in the plane, the total number of spacers of the main spacers 180a and the sub spacers 180b per unit region (12 pixels in this example) is not changed in the plane. The sub spacers 180b are sequentially replaced with the main spacer 180a in the pixels in which any of the spacers is disposed. Thus, the ratio of the pixels in which the main spacers 180a are disposed is increased to make adjustment.

Adoption of this adjustment method provides the following advantages. Plane pressing robustness which is a robustness obtained when a plane pressing stress is applied to the liquid crystal panel 100 depends on the arrangement density of the sub spacers 180b, more specifically, the total number of spacers (arrangement density) of the main spacers 180a and the sub spacers 180b. Therefore, in case of the arrangement of this modified example, the total number of spacers of the main spacers 180a and the sub spacers 180b is uniform in the plane as described above. Consequently, it is possible to obtain an effect that the plane pressing resistance can be made uniform in the plane.

As described in the first preferred embodiment, a relationship between one pixel area and the area (size/diameter) of one columnar spacer changes a specific arrangement rate. Therefore, the arrangement ratio may be appropriately changed and applied within the range of the above adjustment means.

In this modified example, the total number of spacers of the main spacers 180a and the sub spacers 180b per unit region is fixed in the plane. However, when only replacement of the sub spacers 180b is not sufficient for the desired density of the main spacers 180a, or when a ratio is not the desired ratio of the main spacers 180a and the sub spacers 180b, as in the example of the first preferred embodiment, a method for adding the main spacers 180a to positions at which the sub spacers 180b are not disposed such as the center portion in the curving direction may be performed to make adjustment. In that case, the total number of spacers of the main spacers 180a and the sub spacers 180b per unit region is not fixed in the plane, and increases from the surrounding portion to the center portion in the curving direction, as in the example of the first preferred embodiment.

Further, there is a case where combination of replacement of the sub spacer 180b at the center portion at which the arrangement density of the main spacers 180a is increased at maximum, and the method for adding the main spacer 180a to the positions at which the sub spacers 180b are not disposed is used. Even in this case, when the density of the main spacers 180a is insufficient, the sub spacers 180b may not be disposed at the center portion and only the main spacers 180a may be disposed at the center portion, the area density of the main spacers 180a may be decreased outward, and the number of the sub spacers 180b to be disposed may be appropriately increased.

Modified Example 2

Next, a liquid crystal display device according to modified example 2 of the first preferred embodiment which is another preferred embodiment to which the present invention is applied will be described.

In the above first embodiment and modified example 1, the examples where the arrangement density of main spacers 180a is changed according to positions in a curving direction has been described. However, as long as, when a liquid crystal panel is curved, a holding force is reinforced against a large stress generated at the center portion in the curving direction, a method for making the height of the main spacer 180a relatively higher at the center portion than the peripheral portion is also effective. Using this method in combination with a method for changing the arrangement density of the main spacers 180a described in the first preferred embodiment and the first modified example is effective, and this method may be used alone.

Here, the height of the main spacer 180*a* which is made relatively high makes it difficult to arbitrarily change the thickness of a resin layer which forms the main spacer 180*a* in the plane. Further, as long as the height can be adjusted stepwise from the center portion to the surrounding portion in the curving direction, the effect can be obtained to some degree. Therefore, for example, the height of the main spacer 180*a* (i.e., the thickness of the resin which forms the main spacer 180*a*) is made uniform in the plane, or is changed at about two stages. For example, taking into account the main spacers 180*a* of two types of heights in the plane, i.e., the sub spacers 180*b*, the columnar spacers 180 having three types of thicknesses are formed. Then, a presence or an absence of a base pattern formed simultaneously with a wiring pattern in the plane on the portion that closes to the array substrate 110 with which the main spacers 180*a* come into contact is changed. Consequently, it is possible to relatively easily fluctuate the height of the main spacer 180*a* (i.e., the height of the thickness of the resin which forms the main spacer 180*a* and the height of the base pattern) stepwise. When, for example, the thickness of the resin which forms the main spacer 180*a* is made uniform, there are two stages based on the presence or absence of a base. When there are two stages of the thickness of the resin which forms the main spacer 180*a*, it is possible to make adjustment at four stages in total based on a combination with the presence/absence of the base. Also in this modified example, the basic effect of the present invention can be obtained.

<Liquid Crystal Injection Method>

Hereinafter, a method for injecting liquid crystal in the liquid crystal display device according to first preferred embodiment and each modified example will be described.

When a liquid crystal display device 101 is manufactured by injecting liquid crystal between an array substrate 110 and an opposing substrate 120 by using a one drop fill scheme, an excessive or insufficient amount of liquid crystal dropped on one of the array substrate 110 and the opposing substrate 120 fluctuates a cell gap. Particularly, when the liquid crystal panel is curved, and even when, as in the above-described embodiment and each modified example, columnar spacers for determining the cell gap are appropriately disposed such that the cell gap does not narrow at the center portion in the curving direction in a display region, if, for example, the amount of liquid crystal is less than the required amount, a gap failure occurs at the surrounding portion instead of the center portion.

Therefore, for the configuration of columnar spacers 180 in the above-described embodiment and each modified example, and, in addition, the amount of liquid crystal 140 to be dropped, a cell volume in case where the liquid crystal panel 100 is uniformly arranged with a desired cell gap at a curvature at which the curved liquid crystal display device 101 to be manufactured is curved may be calculated, and the amount of liquid crystal corresponding to the cell volume may be set.

In this regard, the amount of liquid crystal corresponding to the cell volume may be calculated by subtracting a volume occupied by the columnar spacer 180 from the simply calculated cell volume to appropriately correct and estimate the amount of liquid crystal as a more accurate and necessary amount of liquid crystal. Further, another method for setting the amount of liquid crystal corresponding to the cell volume decreases the cell volume in the curved liquid crystal display device compared to the cell volume in the flat state before curving. Therefore, the amount of liquid crystal corresponding to the cell volume may be calculated based on the appropriate amount of liquid crystal to be dropped when a liquid crystal display device of the same size which is not curved is manufactured by the above ODF scheme. For example, a plurality of liquid crystal display devices may be made as prototypes by varying the amount of liquid crystal to be decreased from an appropriate amount of liquid crystal in a liquid crystal display device which is not curved, whether or not a cell gap is formed uniformly in the plane may be evaluated, and the amount of liquid crystal which satisfies a condition under which the cell gap is relatively uniformly formed in the plane may be selected and set as an appropriate amount of liquid crystal. Alternatively, the prototype may be made by appropriately adjusting the amount of liquid crystal based on the amount of liquid crystal derived by the above-described calculation method, and the amount of liquid crystal which satisfies a condition under which the cell gap is relatively uniformly formed likewise may be selected and set as an appropriate amount of liquid crystal.

By using the manufacturing method as described above, it is possible to obtain a curved liquid crystal display device having a more uniform cell gap from the center portion to the surrounding portion in the curving direction. As a result, it is possible to further enhance the effect of suppressing deterioration of display quality which is the effect obtained by first preferred embodiment and each modified example.

According to the present invention, it is possible to freely combine the embodiment and each modified example within the scope of the invention, and appropriately modify or omit the embodiment and each modified example.

While the invention has been illustrated and described in detail, the foregoing description is in all aspects illustrative and not restrictive. It is therefore understood that numerous modified examples and variations can be devised without departing from the scope of the invention.

What is claimed is:

1. A liquid crystal display device comprising a liquid crystal panel which displays a video image in a display region in a curved state, wherein
the liquid crystal panel includes
a liquid crystal,
a pair of glass substrates which sandwich the liquid crystal,
main spacers that contact both of the pair of glass substrates and keep an interval between the pair of glass substrates, and
sub spacers, which are each smaller than any of the main spacers and arranged among the main spacers to come into contact with only one of the pair of glass substrates and, when the main spacers elastically deform and the interval between the pair of glass substrates becomes closer, the sub spacers come into contact with both of the pair of glass substrates and keep the interval,
in the display region, a density per unit area of the main spacers at a center portion in a curving direction of the liquid crystal panel is higher than the density of the main spacers at both end portions in the curving direction, and
in the display region, a ratio of the density of the main spacers with respect to the density of the sub spacers at a center portion in the curving direction is higher than the ratio at both end portions in the curving direction.

2. The liquid crystal display device according to claim 1, wherein the density of the main spacers in the display region is set to a predetermined range which suppresses low-temperature foaming and gravity unevenness in the liquid crystal panel.

3. The liquid crystal display device according to claim 2, wherein the density is in a range of 0.005% to 0.02%.

4. The liquid crystal display device according to claim 1, wherein the density of the main spacers is fixed in each of a plurality of divided regions obtained by dividing the display region in the curving direction, and gradually decreases from the divided region at a center portion in the curving direction to each of the plurality of divided regions at both end portions in the curving direction.

5. The liquid crystal display device according to claim 1, wherein the density of the main spacers continuously decreases from a center portion in the curving direction in the display region to both end portions in the curving direction in the display region.

6. The liquid crystal display device according to claim 1, wherein the density of the sub spacers is fixed in the display region.

7. The liquid crystal display device according to claim 6, wherein
the liquid crystal panel includes a plurality of pixels which is aligned in the display region and is a set of pixels of three colors of R, G and B,
the sub spacers are disposed in a pixel of specific one color or two colors of the pixels of the three colors, and
the main spacers are disposed in a pixel of the pixels of the three colors in which the sub spacers are not disposed.

8. The liquid crystal display device according to claim 1, wherein
the liquid crystal panel includes a plurality of pixels which is aligned in the display region and is a set of pixels of three colors of R, G and B, and
the main spacers or the sub spacers are disposed in a pixel of specific one color or two colors of the pixels of the three colors.

9. The liquid crystal display device according to claim 1, wherein, in the display region, a height of the main spacers at the center portion in the curving direction of the liquid crystal panel is higher than a height of the main spacers at the both end portions in the curving direction.

10. The liquid crystal display device according to claim 1, wherein a thickness of each of the pair of glass substrates is 0.1 mm or more and 0.2 mm or less.

11. A method for manufacturing the liquid crystal display device according to claim 1, comprising:
(a) preparing the pair of glass substrates; and
(b) injecting the liquid crystal between the pair of glass substrates by a one drop file method for dropping the liquid crystal on one of the pair of glass substrates,
wherein an amount of the liquid crystal dropped in the (b) is set to an amount corresponding to a cell volume in case of a desired uniform cell gap at a curvature for curving the liquid crystal panel.

12. The liquid crystal display device according to claim 1, wherein
the liquid crystal panel includes a set of pixels of three colors of R, G, and B, and
each of the main spacers and each of the sub spacers are disposed among the set of pixels between the pixels of the three colors.

13. The liquid crystal display device according to claim 1, wherein the density of the main spacers is fixed in each of a plurality of divided regions obtained by dividing the display region in the curving direction, and
the plurality of divided regions includes
a first divided region at a center portion in the curving direction,
a second divided region at both end portions, and
a third divided region provided between the center portion and the both end portions,
the density of the main spacers gradually decreases in at least three stages from the divided region at the center portion in the curving direction to each of the plurality of divided regions at the both end portions in the curving direction.

14. The liquid crystal display device according to claim 3, wherein the density of the main spacers is fixed in each of a plurality of divided regions obtained by dividing the display region in the curving direction, and gradually decreases from the divided region at a center portion in the curving direction to each of the plurality of divided regions at both end portions in the curving direction.

15. A liquid crystal display device comprising a liquid crystal panel which displays a video image in a display region in a curved state, wherein
the liquid crystal panel includes
a liquid crystal,
a pair of glass substrates which sandwich the liquid crystal,
main spacers that contact both of the pair of glass substrates and keep an interval between the pair of glass substrates, and
sub spacers, which are each smaller than any of the main spacers and arranged among the main spacers to come into contact with only one of the pair of glass substrates and, when the main spacers elastically deform and the interval between the pair of glass substrates becomes closer, the sub spacers come into contact with both of the pair of glass substrates and keep the interval,
in the display region, a density per unit area of the main spacers at a center portion in a curving direction of the liquid crystal panel is higher than the density of the main spacers at both end portions in the curving direction,
in the display region, a ratio of the density of the main spacers with respect to the density of the sub spacers at a center portion in the curving direction is higher than the ratio at both end portions in the curving direction, and
the density of a sum of the main spacers and the sub spacers is fixed in the display region.

16. A liquid crystal display device comprising a liquid crystal panel which displays a video image in a display region in a curved state, wherein
the liquid crystal panel includes
a liquid crystal,
a pair of glass substrates which sandwich the liquid crystal,
main spacers that contact both of the pair of glass substrates and keep an interval between the pair of glass substrates, and
sub spacers, which are each smaller than any of the main spacers and arranged among the main spacers to come into contact with only one of the pair of glass substrates and, when the main spacers elastically deform and the interval between the pair of glass substrates becomes closer, the sub spacers come into contact with both of the pair of glass substrates and keep the interval, in the display region, a height of the main spacers at a center portion in a curving direction of the liquid crystal panel is higher than a height of the main spacers at both end portions in the curving direction, and in the display region, a ratio of the density of the main spacers with respect to the density of the sub spacers at a center portion in the curving direction is higher than the ratio at both end portions in the curving direction.

17. The liquid crystal display device according to claim 16, wherein a thickness of each of the pair of glass substrates is 0.1 mm or more and 0.2 mm or less.

18. The liquid crystal display device according to claim 16, wherein the liquid crystal panel includes a set of pixels of three colors of R, G, and B, and each of the main spacers and each of the sub spacers are disposed among the set of pixels between the pixels of the three colors.

* * * * *